(12) United States Patent
Pham et al.

(10) Patent No.: US 9,574,412 B2
(45) Date of Patent: Feb. 21, 2017

(54) PROPPANT MIXING AND METERING SYSTEM

(75) Inventors: Hau Nguyen-Phuc Pham, Houston, TX (US); Miguel Lopez, Houston, TX (US); Laurent Coquilleau, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/122,685

(22) PCT Filed: May 25, 2012

(86) PCT No.: PCT/US2012/039561
§ 371 (c)(1),
(2), (4) Date: Nov. 27, 2013

(87) PCT Pub. No.: WO2012/166590
PCT Pub. Date: Dec. 6, 2012

(65) Prior Publication Data
US 2014/0076569 A1    Mar. 20, 2014

Related U.S. Application Data

(60) Provisional application No. 61/490,698, filed on May 27, 2011.

(51) Int. Cl.
*E21B 21/06*    (2006.01)
*E21B 43/267*   (2006.01)
*G05D 7/06*     (2006.01)

(52) U.S. Cl.
CPC ........... *E21B 21/062* (2013.01); *E21B 43/267* (2013.01); *G05D 7/0605* (2013.01)

(58) Field of Classification Search
CPC .............................. E21B 43/267; E21B 21/062
(Continued)

(56) References Cited

U.S. PATENT DOCUMENTS 2,642,206 A * 6/1953 Reed .............................. 222/429
2,656,072 A * 10/1953 Kornberg ....................... 222/134
(Continued)

FOREIGN PATENT DOCUMENTS

CN            2409141 Y      12/2000
CN          102050285 A       5/2011
(Continued)

OTHER PUBLICATIONS

International Search Report and Written Opinion mailed on Aug. 30, 2012 for International Patent Application No. PCT/US2012/039561, filed on May 25, 2012, 6 pages total.
(Continued)

*Primary Examiner* — Donnell Long
(74) *Attorney, Agent, or Firm* — Michael L. Flynn

(57) ABSTRACT

An oilfield material reservoir is disclosed. The oilfield material reservoir has a body, the body having an upper end, a lower end, a sidewall extending between the upper and lower ends, the sidewall defining a recess within the body, an opening defined by the upper end, and a first orifice defined by the lower end. The oilfield material reservoir is also provided with a metering gate connected to the body at the lower end. The metering gate has a base having a second orifice aligned with the first orifice, and a knife gate connected to the base. The second orifice has a substantially trapezoidal shape. The knife gate is configured to slidably cover the second orifice. A method is also disclosed for controlling a discharge rate of oilfield material within the
(Continued)

oilfield material reservoir by adjusting a metering open area of the second orifice according to mathematical modeling equations.

10 Claims, 4 Drawing Sheets

(58) Field of Classification Search
USPC .............. 222/504, 133, 134, 145.1, 145.7; 166/305.1, 162
See application file for complete search history.

(56) References Cited

U.S. PATENT DOCUMENTS

| | | | | | |
|---|---|---|---|---|---|
| 3,119,529 | A | * | 1/1964 | Maestrelli | 222/145.1 |
| 3,173,582 | A | * | 3/1965 | Walter | 222/185.1 |
| 3,252,630 | A | * | 5/1966 | Berg | 222/331 |
| 3,834,595 | A | * | 9/1974 | Brock et al. | 222/504 |
| 4,359,176 | A | * | 11/1982 | Johnson | 105/240 |
| 5,232,059 | A | * | 8/1993 | Peterson | 175/206 |
| 5,529,204 | A | * | 6/1996 | Sykes | 43/55 |
| 5,829,359 | A | * | 11/1998 | Dohr et al. | 105/310 |
| 5,895,028 | A | | 4/1999 | Varady | |
| 6,024,023 | A | * | 2/2000 | Magolske | 105/282.1 |
| 6,508,387 | B1 | | 1/2003 | Simon et al. | |
| 6,851,580 | B2 | * | 2/2005 | Stank et al. | 222/129 |
| 2005/0000685 | A1 | * | 1/2005 | Pham et al. | 166/90.1 |
| 2010/0038077 | A1 | | 2/2010 | Heilman et al. | |

FOREIGN PATENT DOCUMENTS

| | | | | |
|---|---|---|---|---|
| DE | 8612504 | U1 | 5/1992 | |
| NL | 9200532 | A * | 10/1993 | ........... B65D 90/587 |
| RU | 63521 | U1 | 5/2007 | |
| RU | 85423 | U1 | 8/2009 | |
| SU | 489692 | A1 | 10/1975 | |
| SU | 555387 | A1 | 4/1977 | |
| WO | 0040358 | A1 | 7/2000 | |
| WO | 0168296 | A1 | 9/2001 | |

OTHER PUBLICATIONS

First Office Action issued in CN201280025779.1 on Sep. 17, 2014, 19 pages.
Second Office Action issued in CN201280025779.1 on Apr. 3, 2015, 19 pages.
Third Office Action issued in CN201280025779.1 on Aug. 17, 2015, 20 pages.
Decision on Grant issued in RU2013158131 on Sep. 3, 2014; 16 pages.
European Search Report issued in EP12794080.7 on Oct. 16, 2015; 3 pages.
Examination Report issued in European Application No. 12794080.7 on Nov. 9, 2015; 7 pages.
Office Action issued in CN Application No. 201280025779.1 on Jan. 6, 2016, 20 pages. (with English Translation).
Examination Report issued in Australian Patent Application No. 2012262493 on Apr. 11, 2016; 3 pages.
Office Action issued in Mexian Patent Application No. MX/a/2013/012852 on May 16, 2016; 6 pages. (with English Translation).

\* cited by examiner

PROPPANT MIXING AND METERING SYSTEM

CROSS-REFERENCE TO RELATED APPLICATIONS

The present application claims priority to the provisional patent application identified by U.S. Ser. No. 61/490,698, filed on May 27, 2011, the entire content of which is hereby incorporated herein by reference.

TECHNICAL FIELD

The present disclosure generally relates to systems, methods, and/or apparatus of mixing and metering proppant into fracturing fluid to be injected into a wellbore.

BACKGROUND

The statements made herein merely provide information related to the present disclosure and may not constitute prior art, and may describe some embodiments illustrating the invention.

In hydraulic fracturing, fracturing fluid is injected into a wellbore, penetrating a subterranean formation and forcing the fracturing fluid at pressure to crack and fracture the strata or rock. Proppant is placed in the fracturing fluid and thereby placed within the fracture to form a proppant pack to prevent the fracture from closing when pressure is released, providing improved flow of recoverable fluids, i.e., oil, gas, or water. The success of a hydraulic fracturing treatment is related to the fracture conductivity which is the ability of fluids to flow from the formation through the proppant pack. In other words, the proppant pack or matrix may have a high permeability relative to the formation for fluid to flow with low resistance to the wellbore. Permeability of the proppant matrix may be increased through distribution of proppant and non-proppant materials within the fracture to increase porosity within the fracture.

Some approaches to hydraulic fracture conductivity have constructed proppant clusters in the fracture, as opposed to constructing a continuous proppant pack. These methods may alternate the stages of proppant-laden and proppant-free fracturing fluids to create proppant clusters in the fracture and open channels between them for formation fluids to flow. Thus, the fracturing treatments result in a heterogeneous proppant placement (HPP) and a "room and pillar" configuration in the fracture, rather than a homogeneous proppant placement and consolidated proppant pack. The amount of proppant deposited in the fracture during each HPP stage is modulated by varying fluid transport characteristics, such as viscosity and elasticity; the proppant densities, diameters, and concentrations; and the fracturing fluid injection rate.

Proppant placement techniques based on the fracture geometry have been developed for use during traditional proppant pack operations. However, proppant placement in HPP is considerably more challenging and the art is still in search of ways to improve the proppant placement techniques in HPP operations.

Prior to injection of the fracturing fluid, the proppant and other components of the fracturing fluid may be blended. The current state of technology for enabling existing blending equipment for performing HPP and slickwater fracturing operations relies on the use of automatic proppant concentration control based on proppant metering gate percentage opening in a gravity-fed system. Automatic proppant concentration control based on densitometer feedback is the most commonly used mode for proppant metering in conventional fracturing work, but cannot be used in certain applications due to excessively slow densitometer response times. Additionally, current gate designs in existing blending equipment generally have irregular metering orifice geometries with respect to gate percentage opening that do not allow highly accurate and consistent proppant flow control. A means for achieving consistent, well-behaved proppant metering due to consistent, well-behaved metering orifice geometry for optimal performance is desirable.

Many proppant addition systems use one or more augers to supply proppant or a mixture of proppant and fluids, such as slickwater, gels, or hydrocarbons. In these systems, the proppant may be delivered to the fracturing fluid, pumps, or mixer from an oilfield material reservoir, commonly called a proppant hopper or receiver. The auger meters the proppant volumes and rates into a fluid stream or mixer. The auger may meter the proppant by calculating the known amount of proppant an auger may move at a given auger speed in revolutions per minute (rpm). The density of fracturing fluid including the proppant therefore may be determined, in auger systems, based on the rpm at which the auger is operating in combination with the density of the fracturing fluid determined prior to the addition of the proppant. Auger systems may require a larger area in order to accommodate an auger capable of providing a sufficient volume of proppant to the mixer or the fluid stream.

An alternative to the auger fed proppant addition systems is the use of a gravity fed proppant addition system. Gravity fed proppant addition systems may transfer proppant via gravity free fall to a mixer in order to be added to fracturing fluid. Metering the proppant volume in a gravity fed system may be calculated by determining the flow rate of the proppant through an orifice of a known size, often called a metering gate, when the proppant is in gravity free fall through the orifice. Gravity fed systems may also employ the use of pressurization to aid in transferring proppants into the fluid stream or mixer. Pressurization methods in gravity fed systems may include pressurizing the proppant container subject to the gravity feed or utilizing a venturi effect where a smaller diameter pipe is connected to a larger diameter pipe to draw the proppant from the proppant container into the mixer or fluid stream. Gravity fed systems may require a smaller area, as they may not employ an auger.

Gravity fed proppant addition systems may use automatic proppant concentration control based on the orifice of a known size. Blending equipment has been adapted for slickwater fracturing jobs by use of automatic proppant concentration control based on the metering gate percentage opening in the gravity fed proppant addition system. This automatic proppant concentration control may be called Auto-Concentration in Gate Percentage Mode. Automatic proppant concentration control may be based on densitometer feedback; however, densitometer feedback may not be an effective control mechanism for slickwater applications due to the inability of densitometers to differentiate between the density of low proppant concentration slurries common to slickwater fracturing and the density of the base fluid carrier itself.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect of the present disclosure, at least one embodiment relates to an oilfield material reservoir. In this aspect, the oilfield material reservoir has a body, and a metering gate. The body has an upper end, a lower end, and a sidewall extending between the upper end and the lower end. The sidewall defines a recess within the body. An opening is defined by the upper end, and a first orifice is defined by the lower end. The metering gate is connected to the body at the lower end thereof, and has a base having a second orifice aligned with the first orifice, and a knife gate connected to the base. The second orifice has a substantially trapezoidal shape. The knife gate is configured to slidably cover the second orifice.

According to another aspect of the present disclosure, at least one embodiment relates to a method for controlling a discharge rate of an oilfield material within the oilfield material reservoir by adjusting a metering open area of the second orifice according to mathematical modeling equations. In this method, an oilfield material reservoir is provided with an opening for receiving an oilfield material and a first orifice for discharging the oilfield material. A metering gate is provided at the first orifice for controlling the discharge rate of the oilfield material by adjusting the metering gate according to the set of equations taking into consideration a metering open area of the metering gate, a height of the second orifice of the metering gate, a top length of the second orifice of the metering gate, a bottom length of the second orifice of the metering gate, and a height of the metering open area of the metering gate. The equations may also consider a baseline oilfield material flow rate and a constant for the baseline oilfield material. The equations may also consider, in controlling the metering gate, a desired mass flow rate for the actual oilfield material used, a particle size factor affecting flow rate for the actual oilfield material, a particle geometry factor affecting flow rate for the actual oilfield material, a particle texture factor affecting flow rate for the actual oilfield material, a particle coating factor affecting flow rate for the actual oilfield material, an environmental vibration factor affecting flow rate for the actual oilfield material, an environmental moisture factor affecting flow rate for the actual oilfield material, a specific gravity for the actual oilfield material, and a specific gravity for the baseline oilfield material on which the baseline oilfield material is determined.

BRIEF DESCRIPTION OF THE DRAWINGS

Embodiments of a system and method for mixing and metering oilfield material are described with reference to the following figures. The same numbers are used throughout the figures to reference like features and components. Implementations of various technologies will hereafter be described with reference to the accompanying drawings. However, it should be understood that the accompanying drawings illustrate the various implementations described herein and are not meant to limit the scope of various technologies described herein.

DETAILED DESCRIPTION

At the outset, it should be noted that in the development of any such actual embodiment, numerous implementation-specific decisions will be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended to include any concentration within the range, including the end points, is to be considered as having been stated. For example, "a range of from 1 to 10" is to be read as indicating each possible number along the continuum between about 1 and about 10. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and all points within the range.

Figure 1:
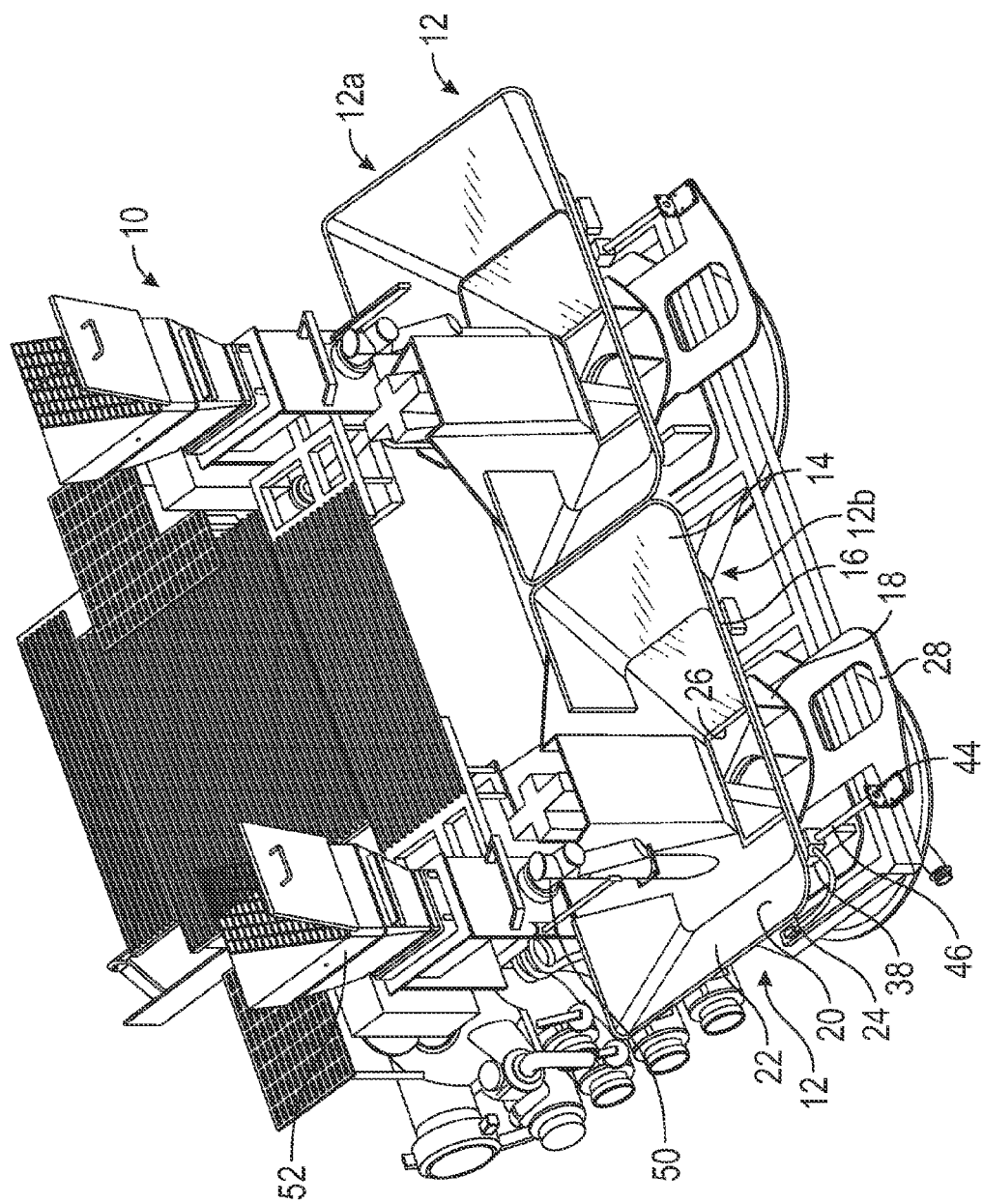
FIG. 1 shows a perspective view of a blending unit with two oilfield material reservoirs constructed in accordance with an embodiment of the present disclosure.

Referring now to FIG. 1, shown therein is a blending unit 10 with two oilfield material reservoirs, or hoppers 12, constructed in accordance with the inventive concepts disclosed herein. The blending unit 10 may be mounted on a trailer or skid to facilitate injection of oilfield material into a wellbore. Two hoppers 12*a* and 12*b* are shown, with each hopper 12 having a body 14 configured to receive an oilfield material, such as a proppant.

For purposes of conciseness, the term "oilfield material" as used herein may include proppant, but may also include and should not be limited to, dry guar, cement, suspending agents of the type used in drilling mud, such as polymers, clays, emulsions, transition metal oxides and hydroxides, as will be appreciated by a person skilled in the art.

The term "proppant" as used herein relates to sized particles mixed with fracturing fluid to provide an efficient conduit for production of fluid from the reservoir to the wellbore. For example, the term "proppant" as used herein may include extramatrical channel-forming materials, referred to as channelant, and also may include naturally occurring sand grains or gravel, man-made or specially engineered proppants, such as resin-coated sand or high-strength ceramic materials like sintered bauxite. Proppant materials may also include fibers. The fibers can be, for example, glass, ceramics, carbon including carbon-based compounds, metal including metallic alloys, or the like, or a combination thereof, or a polymeric material such as PLA, PGA, PET, polyol, or the like, or a combination thereof.

Figure 2:
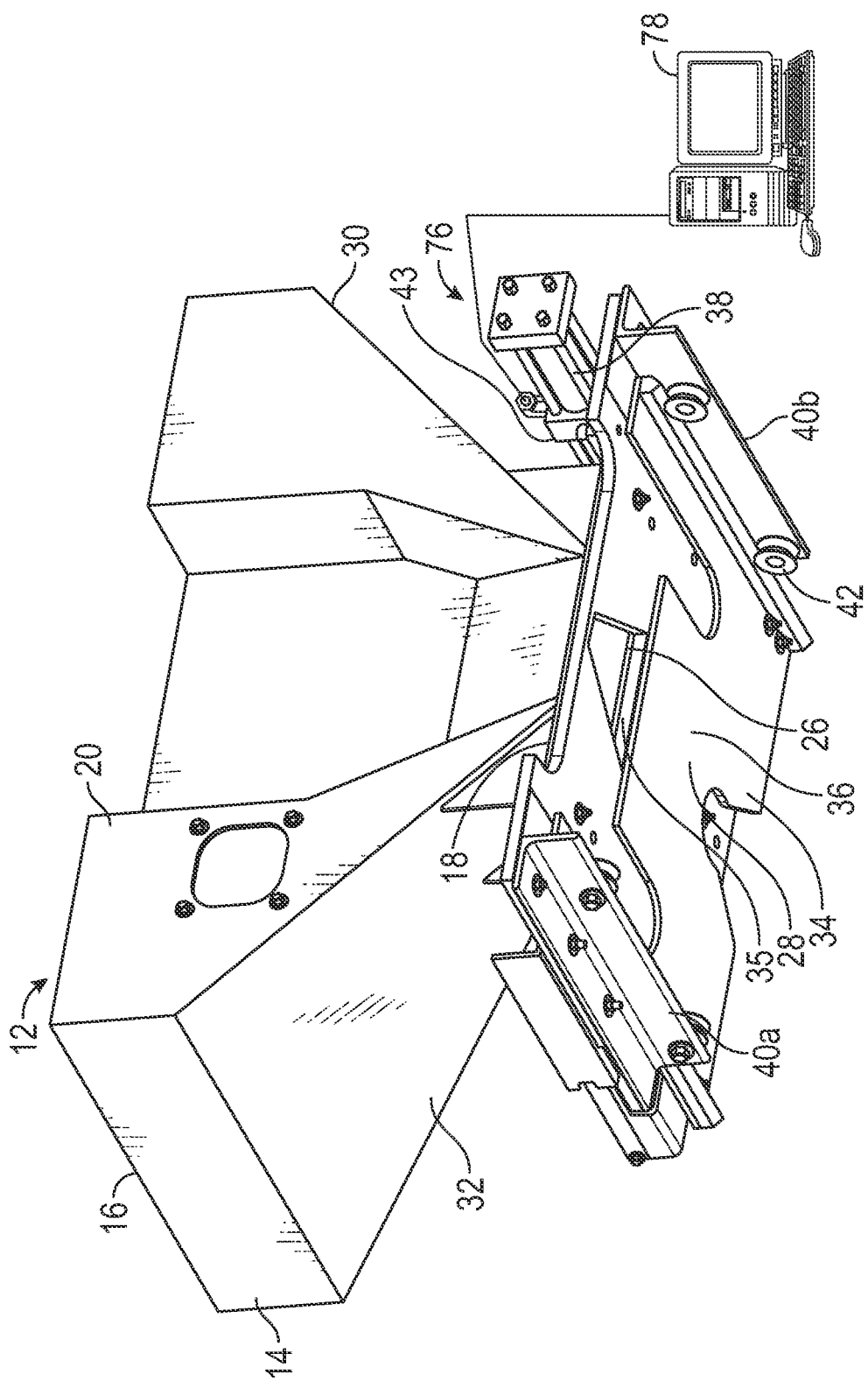
FIG. 2 shows a perspective view of the oilfield material reservoir constructed in accordance with an embodiment of the present disclosure.

Referring to FIGS. 1-2, the body 14 of the hopper 12 has an upper end 16, a lower end 18, and a sidewall 20 extending between the upper end 16 and the lower end 18. The sidewall 20 defines a recess 22 within the body 14 of the hopper 12. The upper end 16 of the body 14 defines an opening 24 for receiving the proppant, and the lower end 18 of the body 14 defines a first orifice 26 for discharging the proppant. Connected to the lower end 18 of the body 14 is a metering gate 28 which may be used to control the discharge rate of the proppant to a mixer (not shown).

The sidewall 20 of the body 14 may be configured with a first side 30 and a second side 32 which taper from the upper end 16 to the lower end 18. As shown in FIGS. 1-2, the first side and second side 32 may taper from substantially near the upper end 16 of the body 14 to the lower end 18 of the body 14. The tapering of the first side 30 and second side 32 may facilitate directing a flow of proppant from the opening 24, through the recess 22, to the first orifice 26. Although shown in FIGS. 1-2 with the first side 30 and second side 32 as tapering, it will be understood that one or more sides of the sidewall 20 of the body 14 may be tapered between the upper end 16 and the lower end 18 to facilitate the flow of proppant from the opening 24, through the recess 22, to the orifice 26. The flow of proppant through the recess 22 and first orifice 26 may be a gravity-fed flow where proppant travels through the first orifice 26 by gravity to the mixer.

The first orifice 26, defined by the lower end 18 of the body 14, may form the shape of a trapezoid, triangle, square, rectangle, or other polynomial. The area of the first orifice 26 may be manipulated with the metering gate 28 connected to the lower end 18 of the body 14. Manipulating the area of the first orifice 26 may allow for the proppant flow rate to be regulated through the first orifice 26. Regulation of the flow rate may involve the creation of a mathematical model where the proppant rate may be expressed as a function of factors representing the effects of physical proppant properties and environmental factors to achieve a desired flow rate of proppant in gravity free fall through the first orifice 26, as will be discussed in more detail below.

The metering gate 28 connected to the lower end 18 of the body 14 may comprise a base 34 connected to the lower end 18 of the body 14, a second orifice 35 formed within the base 34, a knife gate 36 connected to the base 34 and configured to slidably cover the first orifice 26 and/or the second orifice 35, and an actuator 38 connected to the base 34 and the knife gate 36 configured to cause the knife gate 36 to slidably cover the second orifice 35. The second orifice 35, formed within the base 34, can be substantially trapezoidal in shape and overlaps the first orifice 26 of the body 14 of the hopper 12, such that when the knife gate 36 slidably covers the second orifice 35, the knife gate 36 also slidably covers the first orifice 26. The base 34 may be connected to the lower end 18 by brazing, welding, bolting, or any other suitable means of connection. The knife gate 36 may be connected to the base 34 by brackets 40a and 40b, as shown in FIG. 2, and with a plurality of rollers 42. The knife gate 36 may be mounted between the brackets 40a and 40b and between the plurality of rollers 42 and the base 34, so as to secure the knife gate 36 against the base 34. The knife gate 36, mounted between the plurality of rollers 42 and the base 34 may then slidably move beneath the base 34 so as to slidably cover the second orifice 35. The actuator 38 may be mechanically connected to the base 34 and the knife gate 36 via any suitable method such that the actuator 38 may articulate the knife gate 36 between completely covering the second orifice 35, completely uncovering the second orifice 35, and any level of partial coverage therebetween.

Figure 3:
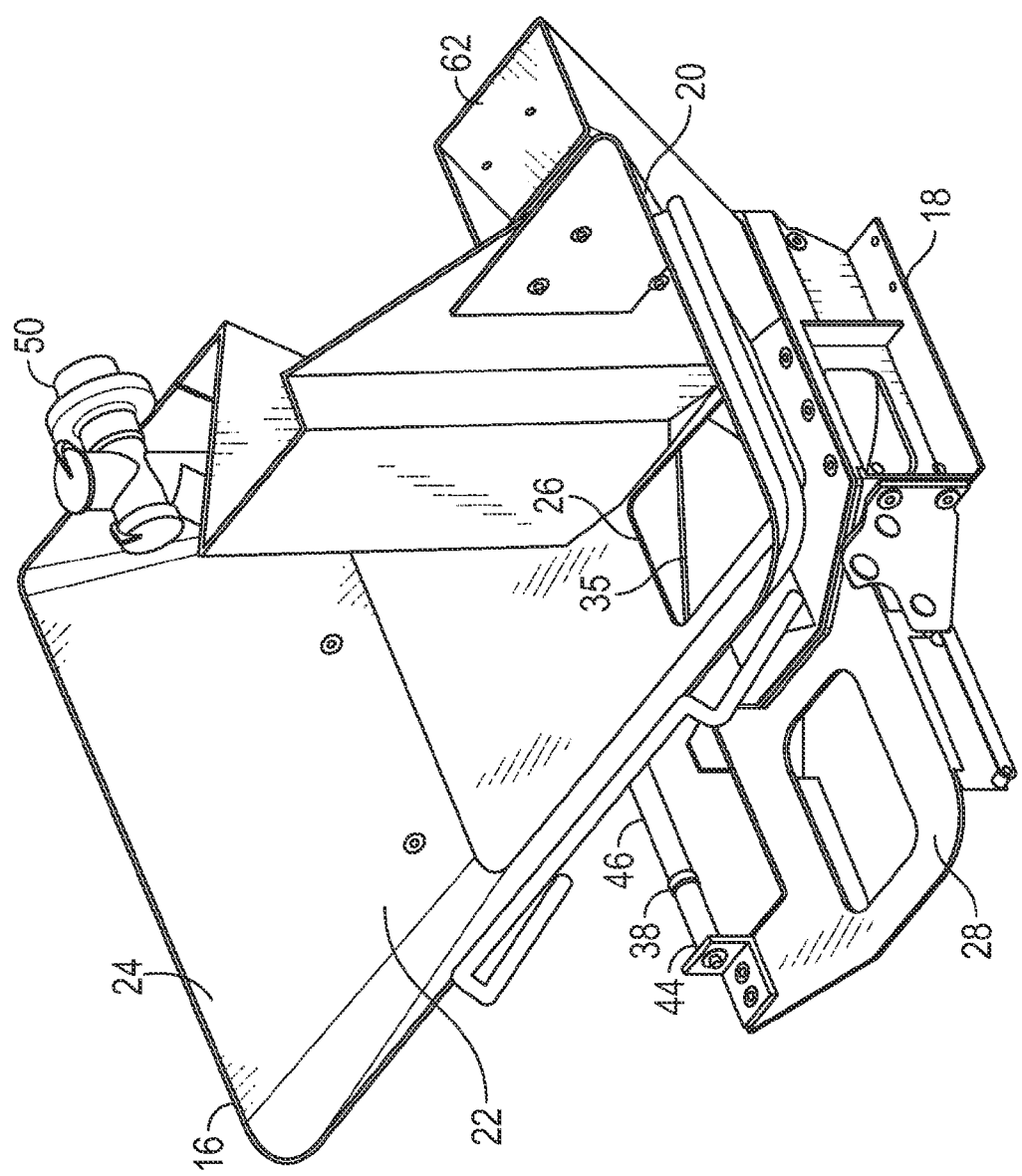
FIG. 3 shows a perspective view of one of the oilfield material reservoirs of FIG. 1.

The actuator 38 may be implemented as a pneumatic cylinder, hydraulic cylinder, electric cylinder, or any other actuator 38 suitable to cause the knife gate 36 to slidably cover the second orifice 35. As shown in FIGS. 1-3, the actuator 38 may be implemented as a hydraulic cylinder connected to the base 34 by a housing 43 and connected to the knife gate 36 at a piston head 44. The actuator 38 may articulate the knife gate 36 between open, close, and intermittent positions of closure of the second orifice 35 by extending or retracting a piston 46. Extending and retracting the piston 46 of the actuator 38 may be performed by sending electrical signals through a control unit or system 76 electrically connected to a computer, processor, controller, or other electronic device 78 capable of sending and receiving data indicative of instructions for articulating the knife gate 36.

The hopper 12 may also be provided with piping 50 through the sidewall 20 in communication with a mixer (not shown) below the hopper 12. The piping 50 may also be provided in communication with the recess 22 of the hopper 12. The piping 50 may be connected to a dry additive feeder 52 such that dry additive chemicals from the dry additive feeder 52 may be discharged through the piping 50 passing through the sidewall 20 of the hopper 12 and into the mixer. The piping 50 may also discharge dry additive chemicals into the hopper 12, such that the dry additive chemicals are discharged from the dry additive feeder 52, into the piping 50, and into the recess 22, thereby flowing with the proppant into the mixer through the first and second orifices 26 and 35, respectively.

FIG. 3 illustrates the hopper 12 as provided with a chute 62 extending along an exterior surface of the body 14 of the hopper 12. The chute 62 may have a connection to the body 14 formed via bolts, welding, brazing, or any other suitable method. The chute 62 may be in communication with an inlet leading to the mixer disposed below the hopper 12 and chute 62. The chute 62 may enable disbursement of a non-proppant additive, such as a fiber, to the mixer through the inlet. The inlet may receive the non-proppant additive from the chute 62 and the proppant from the hopper 12, or the mixer may have a plurality of inlets through which the non-proppant additive and the proppant individually flow.

Figure 4:
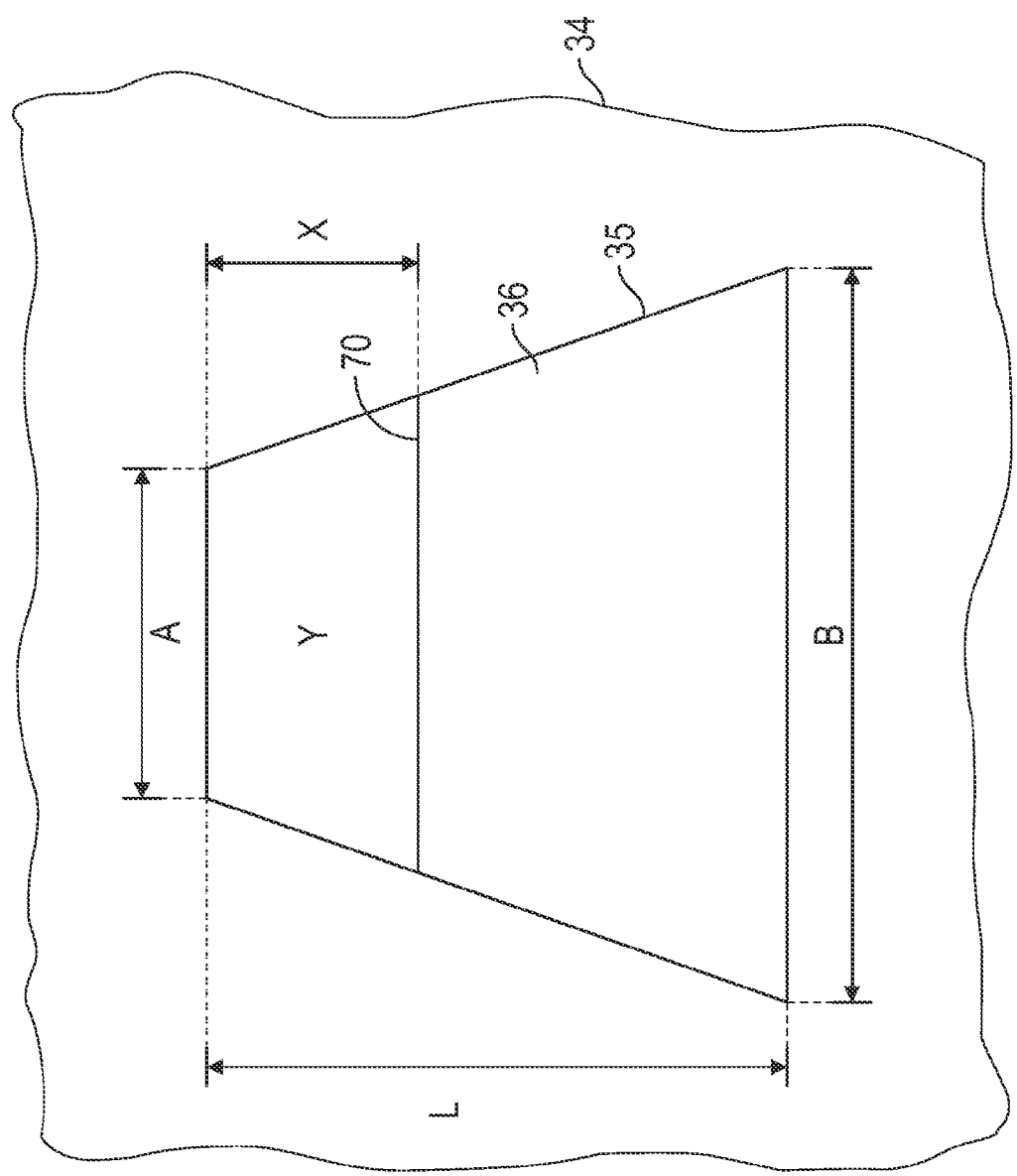
FIG. 4 shows a partial, top plan view of a base having a second orifice partially covered by a knife gate in accordance with an embodiment of the present disclosure.

Referring now to FIG. 4, in operation, the proppant flow rate can be regulated and predicted through a metering orifice geometry while accounting for certain physical proppant characteristics and environmental factors that affect flow rate such as particle mass density, particle size, flow factors accounting for geometry (e.g., roundness, angularity, shape irregularity, etc.), flow factors accounting for surface texture (e.g., roughness, smoothness, etc.), flow factors accounting for surface coatings (e.g., cured or partially cured resinous coatings), vibration from surroundings, moisture, etc. The metering orifice geometry may be applied, considering the above characteristics, to determine and automatically articulate the knife gate 36 to enable a desired size of the second orifice 35 by at least partially covering the first and second orifices 26 and 35 with the knife gate 36.

The regulation and prediction of proppant flow rate may involve the creation of a model in a mathematical form that allows proppant flow rate to be expressed as a function of factors representing the effects of the foregoing listed physical proppant properties and environmental factors applied to the metering orifice geometry whose area, deemed directly proportional to flow rate, can be expressed in a form that would allow the prediction of how much of the orifice geometry would need to be open to achieve a desired flow rate of proppant in gravity free fall.

The geometry of the first and second orifices 26 and 35, respectively, may be implemented in a trapezoidal shape, as shown in FIGS. 2 and 3. The area of a trapezoid can be expressed in such a way as to make the percentage of opening of the first and second orifices 26 and 35 the independent variable in a second degree polynomial formulation. After accounting for the effects on proppant flow from the foregoing listed environmental and physical proppant properties, the resulting model may allow the required gate percentage opening to be solved using a quadratic equation when presented with a required proppant metering rate for a desired proppant concentration and downhole slurry rate. The metering orifice geometry model therefore may form a basis for an automatic proppant control system for heterogeneous proppant placement operations and slickwater applications.

FIG. 6 illustrates one example of the second orifice 35 in the current application. The equation for the area of a trapezoid can be expressed as:

$$Y = \frac{L(B-A)}{2}(X/L)^2 + LA(X/L) \quad \text{(Equation I)}$$

which is a second degree polynomial with X/L as the independent variable. Although the present disclosure discusses the second orifice 35 in terms of a trapezoidal shape, it will be understood by those skilled in the art that this equation is also applicable to the second orifice 35 where the second orifice 35 is in the shape of other polynomials such as a triangle, a square, or a rectangle, for example.

A metering open area Y may be created with specific dimensional values assigned for the parameters A, B, and L, and used in conjunction with the knife gate 36 that travels along the span L of the second orifice 35, then X/L represents the fraction of the knife gate 36 span along L at which the second orifice 35 may be open for proppant flow through the metering open area Y at gate position X. The metering open area Y can be defined by the second orifice 35 in the base 34 of the metering gate 28 and a front edge 70 of the knife gate 36. Additionally, X/L when expressed as a percentage may also be known as the knife gate 72 percentage of opening.

For a given oilfield material, such as a proppant, chosen to serve as a baseline, the proppant flow rate $P_{baseline}$ through the metering open area Y can be expressed as the metering open area Y multiplied by a proportionality entity $C_{baseline}$ such that:

$$P_{baseline} = \quad \text{(Equation II)}$$
$$C_{baseline}Y = C_{baseline}\left[\frac{L(B-A)}{2}(X/L)^2 + LA(X/L)\right]$$

with $C_{baseline}$ having units of mass flow rate per unit of metering open area Y, and having the form of a function that inherently accounts for the following for the specific baseline proppant and existing conditions: particle mass density; particle size; flow factors accounting for geometry (e.g., roundness, angularity, shape irregularity, etc.); flow factors accounting for surface texture (e.g., roughness, smoothness, etc.); flow factors accounting for surface coatings (e.g., cured or partially cured resinous coatings); vibration from surroundings; and moisture, etc., for example.

To further expand the model to allow for flow rate predictions for other types of proppants with physical properties that may differ from the baseline proppant, the following factors can be applied to $P_{baseline}$ to yield the following:

$$Z_{proppant} = \quad \text{(Equation III)}$$
$$F_{size}F_{geometry}F_{texture}F_{coating}F_{vibration}F_{moisture}(SG_{proppant}/$$
$$SG_{baseline})P_{baseline} =$$
$$F_{size}F_{geometry}F_{texture}F_{coating}F_{vibration}F_{moisture}(SG_{proppant}/$$
$$SG_{baseline})C_{baseline}\left[\frac{L(B-A)}{2}(X/L)^2 + LA(X/L)\right]$$

The variable $Z_{proppant}$ may be equal to a desired mass flow rate for a given proppant. $F_{size}$ may be equal to a particle size factor affecting flow rate for a given proppant. $F_{geometry}$ may be equal to a particle geometry factor affecting flow rate for a given proppant. $F_{texture}$ may be equal to a particle texture factor, for instance a particle surface texture, affecting flow rate for a given proppant. $F_{coating}$ may be equal to a particle coating factor, for instance a particle surface coating, affecting flow rate for a given proppant. $F_{vibration}$ may be equal to an environmental vibration factor affecting flow rate for a given proppant. $F_{moisture}$ may be equal to an environmental moisture factor affecting flow rate for a given proppant. $SG_{proppant}$ may be equal to a specific gravity for a given proppant. Finally, $SG_{baseline}$ may be equal to a specific gravity for the baseline proppant on which $P_{baseline}$ is founded The foregoing equation can be arranged in the form of:

$$K_1 x^2 + K_2 x + K_3 = 0 \quad \text{(Equation IV)}$$

such that:

$$K_1 = F_{size}F_{geometry}F_{texture}F_{coating}F_{vibration}F_{moisture}(SG_{proppant}/SG_{baseline})$$
$$C_{baseline}\left[\frac{L(B-A)}{2}\right]$$
$$K_2 = F_{size}F_{geometry}F_{texture}F_{coating}F_{vibration}F_{moisture}(SG_{proppant}/SG_{baseline})$$
$$C_{baseline}LA$$
$$K_3 = -Z_{proppant}$$
$$x = X/L$$

The factors $F_{size}$, $F_{geometry}$, $F_{texture}$, $F_{coating}$, $F_{vibration}$, and $F_{moisture}$ may be generally empirically determined and may be arrived at through a proper design of experiments methodology in conjunction with assumptions that may help simplify the process in achieving a reasonably accurate model.

Once the parameters $K_1$ and $K_2$ are arrived at, and knowing the required proppant rate $Z_{proppant}$ desired to achieve a specific proppant concentration at a specific downhole slurry rate, then the required gate fractional opening X/L can be solved for using the quadratic equation:

$$x = \frac{-K_2 + (K_2^2 - 4K_1K_3)^{1/2}}{2K_1} \quad \text{(Equation V)}$$

As shown in FIG. 2, the hopper 12 may also include a control system 76. In general, the control system 76 is provided with the actuator 38 and one or more computer 78.

The actuator 38 may be implemented as previously described above. The computer 78 may include one or more processor, one or more non-transitory computer readable medium, one or more input devices, and one or more output devices. The one or more processor may be implemented as a single processor or multiple processors working together to execute computer executable instructions. Embodiments of the one or more processors include a digital signal processor, a central processing unit, a microprocessor, a multi-core processor, and combinations thereof. The one or more processor may be coupled to the one or more non-transitory computer readable medium and capable of communicating with the one or more non-transitory computer readable medium via a path, which may be implemented as a data bus, for example. The one or more processor may be capable of communicating with the input device and the output device via paths similar to the path described above coupling the one or more processor to the one or more non-transitory computer readable medium. The one or more processor may also be capable of interfacing and/or communicating with one or more networks via a communications device such as by exchanging electronic, digital, and/or optical signals via the communications device using a network protocol such as TCP/IP. It is to be understood that in certain embodiments using more than one processor, the one or more processor may be located remotely from one another, locating in the same location, or comprising a unitary multicore processor. The one or more processor may be capable of reading and/or executing computer executable instructions and/or creating, manipulating, altering, and storing computer data structures into the one or more non-transitory computer readable medium.

The one or more non-transitory computer readable medium stores computer executable instructions and may be implemented as any conventional non-transitory computer readable medium, such as random access memory (RAM), a hard drive, a DVD-ROM, a BLU-RAY, a floppy disk, an optical drive, and combinations thereof. When more than one non-transitory computer readable medium is used one or more non-transitory computer readable medium may be located in the same physical location as the one or more processor, and one or more non-transitory computer readable medium may be located in a remote physical location from the one or more processor. The physical location of the one or more non-transitory computer readable medium can be varied, and one or more non-transitory computer readable medium may be implemented as a "cloud memory," i.e. one or more non-transitory computer readable medium which is partially, or completely based on or accessed using the network, so long as at least one of the one or more non-transitory computer readable medium is located local to the one or more processor.

The computer executable instructions stored on the one or more non-transitory computer readable medium may comprise logic representing Equations I-V, described in relation to FIG. 4 above, for expressing the metering open area Y of the second orifice 35 and the proppant flow rate. The computer may cause the actuator 38 to extend the piston 46 to cover more of the second orifice 35 thereby reducing the size of the metering open area Y or retract the piston 46 to cover less of the second orifice 35 thereby increasing the size of the metering opening area Y. The computer may cause piston 46 to extend and retract based on inputs from a user terminal connected to the computer 78, or automatically based on sensors within the hopper 12 providing data related to the proppant factors of Equation III.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should be read as consistent with and as support for the following claims, which are to have their fullest and fairest scope.

The scope of patented subject matter is defined by the allowed claims. Moreover, the claim language is not intended to invoke paragraph six of 35 USC §112 unless the exact words "means for" are used. The claims as filed are intended to be as comprehensive as possible, and no subject matter is intentionally relinquished, dedicated, or abandoned.

What is claimed is:

1. An oilfield material reservoir, comprising:
   a body, the body having an upper end, a lower end, a sidewall extending between the upper end and the lower end, the sidewall defining a recess within the body, an opening defined by the upper end, and a first orifice defined by the lower end;
   a metering gate connected to the body at the lower end, the metering gate comprising a base, the base defining a second orifice aligned with the first orifice, the second orifice having a substantially trapezoidal shape; and
   a knife gate slidably connected to the base of the metering gate by an actuator, the actuator configured to articulate the knife gate between a position completely opening the first and second orifices, a position completely covering the first and second orifices, and intermittent positions of closure of the first and second orifices,
   wherein the first orifice defines a shape different than the trapezoidal shape of second orifice, the first and second orifices defining a metering geometry selected to achieve a desired flow rate of an oilfield material through the orifices based on a position of the metering gate with respect to the orifices.

2. The oilfield material reservoir of claim 1, wherein the actuator has a base connected to the base of the metering gate and a piston with a piston head, extending from the base, connected to the knife gate.

3. The oilfield material reservoir of claim 2, wherein the piston of the actuator retracts to slidably cover the second orifice with the knife gate, and extends to slidably uncover the second orifice.

4. The oilfield material reservoir of claim 1, wherein the actuator is a hydraulic cylinder.

5. The oilfield material reservoir of claim 1, further wherein a front edge of the knife gate defines a metering open area of the first and second orifices.

6. The oilfield material reservoir of claim 1, further comprising piping in communication with the recess of the hopper and a dry additive feeder.

7. The oilfield material reservoir of claim 1, wherein the actuator is configured to articulate the knife gate to slidably place the knife gate to a desired position between an open position, a closed position, and positions intermediate the open and closed positions with respect to the second and first orifices to achieve the desired oilfield material flow rate through the orifices.

8. The oilfield material reservoir of claim 7, wherein, in operation of the oilfield material reservoir, the actuator articulates the knife gate to a determined metering orifice geometry to achieve the desired oilfield material flow rate through the orifices.

9. The oilfield material reservoir of claim 1, wherein, in operation of the oilfield material reservoir, the actuator articulates the knife gate to a determined knife gate percentage opening.

10. The oilfield material reservoir of claim 1, wherein, the orifice geometry enables the creation of a mathematical model to enable the flow of oilfield material through the orifices to be regulated and predicted.

* * * * *